T. E. ATTWELL.
DEVICE FOR ROASTING CHESTNUTS AND THE LIKE.
APPLICATION FILED DEC. 30, 1908.
923,756.  Patented June 1, 1909.
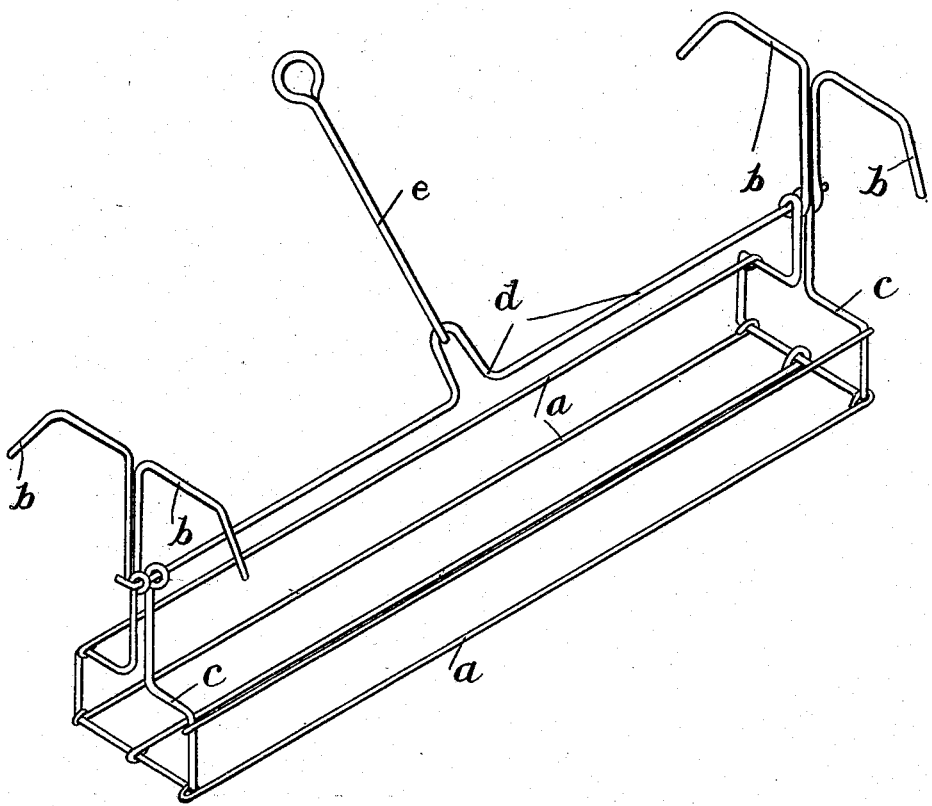
Witnesses:-
C. M. Crawford
C. Heymann
Inventor:-
Theodore Ellard Attwell
by B. Singer
Attorney
THE NORRIS PETERS CO., WASHINGTON, D. C.

UNITED STATES PATENT OFFICE.

THEODORE ELLARD ATTWELL, OF HADLEIGH, ENGLAND.

DEVICE FOR ROASTING CHESTNUTS AND THE LIKE.

No. 923,756.　　　　Specification of Letters Patent.　　　Patented June 1, 1909.

Application filed December 30, 1908. Serial No. 469,961.

*To all whom it may concern:*

Be it known that I, THEODORE ELLARD ATTWELL, a subject of His Majesty the King of the United Kingdom of Great Britain and Ireland, residing at Hadleigh, Essex, in the county of Essex, in that part of the United Kingdom called England, have invented a new or Improved Device for Roasting Chestnuts and the Like, of which the following is a specification.

This invention relates to a new or improved device for roasting chestnuts and the like the object being to provide a simple and efficient contrivance so formed as to contain a quantity of such nuts and capable of being suspended from the bars of any ordinary fire grate, while means are provided whereby the said device may be quickly and easily reversed so as to admit of the nuts or the like being thoroughly roasted on both sides. To this end a preferably rectangular wire basket or frame is provided which is comparatively long in proportion to its breadth and this basket or frame is designed to hold the nuts or the like while at each side and at the extremities thereof it is furnished with a pair of hooks whereby it may be suspended from the bars of a grate and in order that it may be conveniently turned as required, it is carried upon a transverse cross rod, pivoting in the ends of the basket or frame, in connection with which a suitable handle is arranged to admit of it being readily turned from side to side so as to be supported by either pair of hooks.

In order that this invention may be more fully understood it will now be described with reference to the accompanying drawing which is a diagrammatic perspective view of a device according to this invention.

As clearly shown in the drawing the device comprises a wire basket or frame *a* preferably to the ends *c* of which are secured pairs of oppositely opposed hooks *b* for supporting it as hereinbefore described while it is carried upon a cross rod *d* pivoting in the ends *e* and having arranged in connection therewith a handle *e* whereby it may be lifted and turned as required.

What I claim as my invention and desire to secure by Letters Patent is:—

A device for roasting chestnuts and the like comprising a laterally extended wire frame or basket furnished with oppositely opposed pairs of hooks and carried upon a transverse cross bar or rod, pivoting in the ends of the basket or arranged in connection therewith, substantially as herein described and shown and for the purposes specified.

In testimony whereof I have signed my name to this specification in the presence of two subscribing witnesses.

THEODORE ELLARD ATTWELL.

Witnesses:
　OLIVE DACE,
　VICTOR LAZARUS.